(12) United States Patent
Nikles et al.

(10) Patent No.: US 7,406,984 B2
(45) Date of Patent: Aug. 5, 2008

(54) FLUID DISTRIBUTION DEVICE

(75) Inventors: Gerhard Nikles, Carpenedolo (IT); Alberto Turrini, Carpenedolo (IT)

(73) Assignee: Nikles Tec Italia S.r.l., Carpenedolo (Brescia) (IT)

(*) Notice: Subject to any disclaimer, the term of this patent is extended or adjusted under 35 U.S.C. 154(b) by 50 days.

(21) Appl. No.: 11/375,575

(22) Filed: Mar. 15, 2006

(65) Prior Publication Data

US 2006/0207667 A1 Sep. 21, 2006

(30) Foreign Application Priority Data

Mar. 15, 2005 (IT) .......................... BS2005A0037

(51) Int. Cl.
*F16K 11/044* (2006.01)
(52) U.S. Cl. ..................... 137/867; 137/625.5
(58) Field of Classification Search ................. 137/359, 137/454.2, 625.48, 625.5, 867; 251/148, 251/367; 4/675
See application file for complete search history.

(56) References Cited

U.S. PATENT DOCUMENTS

| | | | | |
|---|---|---|---|---|
| 1,263,107 A | * | 4/1918 | Quinn | 137/867 |
| 1,835,734 A | * | 12/1931 | Wanzenberg | 137/597 |
| 2,662,721 A | * | 12/1953 | Giauque | 251/257 |
| 3,369,564 A | * | 2/1968 | Puccinelli et al. | 137/625.5 |
| 3,572,384 A | * | 3/1971 | Taylor | 137/625.5 |
| 4,989,640 A | * | 2/1991 | Steffes et al. | 137/625.5 |
| 5,184,773 A | * | 2/1993 | Everingham | 237/12.3 B |
| 5,397,098 A | * | 3/1995 | Schreiner | 251/122 |

* cited by examiner

*Primary Examiner*—John Fox
(74) *Attorney, Agent, or Firm*—Shoemaker and Mattare

(57) ABSTRACT

A fluid distribution device comprising a "T" shaped body suitable for being connected to a fluid feeding tubing by an inlet and defining two water outlets and wherein inside the body there is provided a seat for a cartridge wherein there is arranged a gate axially moving along the axis of the two outlets by control means actually by a user, for allowing the water flow from the inlet selectively to one of the two outlets or to both at the same time.

9 Claims, 8 Drawing Sheets

FLUID DISTRIBUTION DEVICE

FIELD OF THE INVENTION

The object of the present invention is a fluid distribution device, particularly for a shower unit.

STATE OF THE ART

Conventional systems are usually provided with a system separate from the tubing, normally not adjustable, for water supply and the flow switching control built in the tap.

Therefore, it is clear that having multiple water adjustment and/or switching systems divided into multiple operating units is uneconomical in terms of time and costs.

The object of the present invention is to provide a single water distribution device which should overcome the disadvantages mentioned with reference to the prior art.

SUMMARY OF THE INVENTION

Such object is achieved by a device according to the following claim 1. The dependent claims describe embodiment variations.

BRIEF DESCRIPTION OF THE DRAWINGS

The features and advantages of the device according to the present invention will appear more clearly from the following description, made by way of an indicative and non-limiting example with reference to the annexed figures, wherein.

DETAILED DESCRIPTION OF THE INVENTION

In accordance with a general embodiment and with reference to the annexed figures, reference numeral 100 globally denotes a fluid distribution device, for example water, in particular for shower structures.

Device 100 of the present invention comprises a body 7 suitable for being in fluid connection with a water feeding tubing 32 by an inlet 7a, arranged along an axis Y.

According to an aspect of the invention, body 7 is substantially shaped as a "T".

In fact, body 7 defines at least two water outlets 7b and 7c.

Preferably, there are two outlets.

The outlets are coaxially aligned along an axis X, that is, they are facing and opposed.

Preferably, in fact, axis X and axis Y are orthogonal, in the normal use of device 100.

Favorably, one of the outlets is provided for the fluid connection to a shower head, while the other outlet is intended for the fluid connection with a flexible shower tube.

In fact, according to an aspect of the invention, device 100 envisages the presence of a threaded union 39 on the bottom outlet 7c; such union is provided for connecting a fluid utility, such as a flexible tube provided with a spray head.

Moreover, the top outlet 7b is associated to a union 8 for the connection to a metal tube in turn connected to a shower head or another utility.

Figure 1:
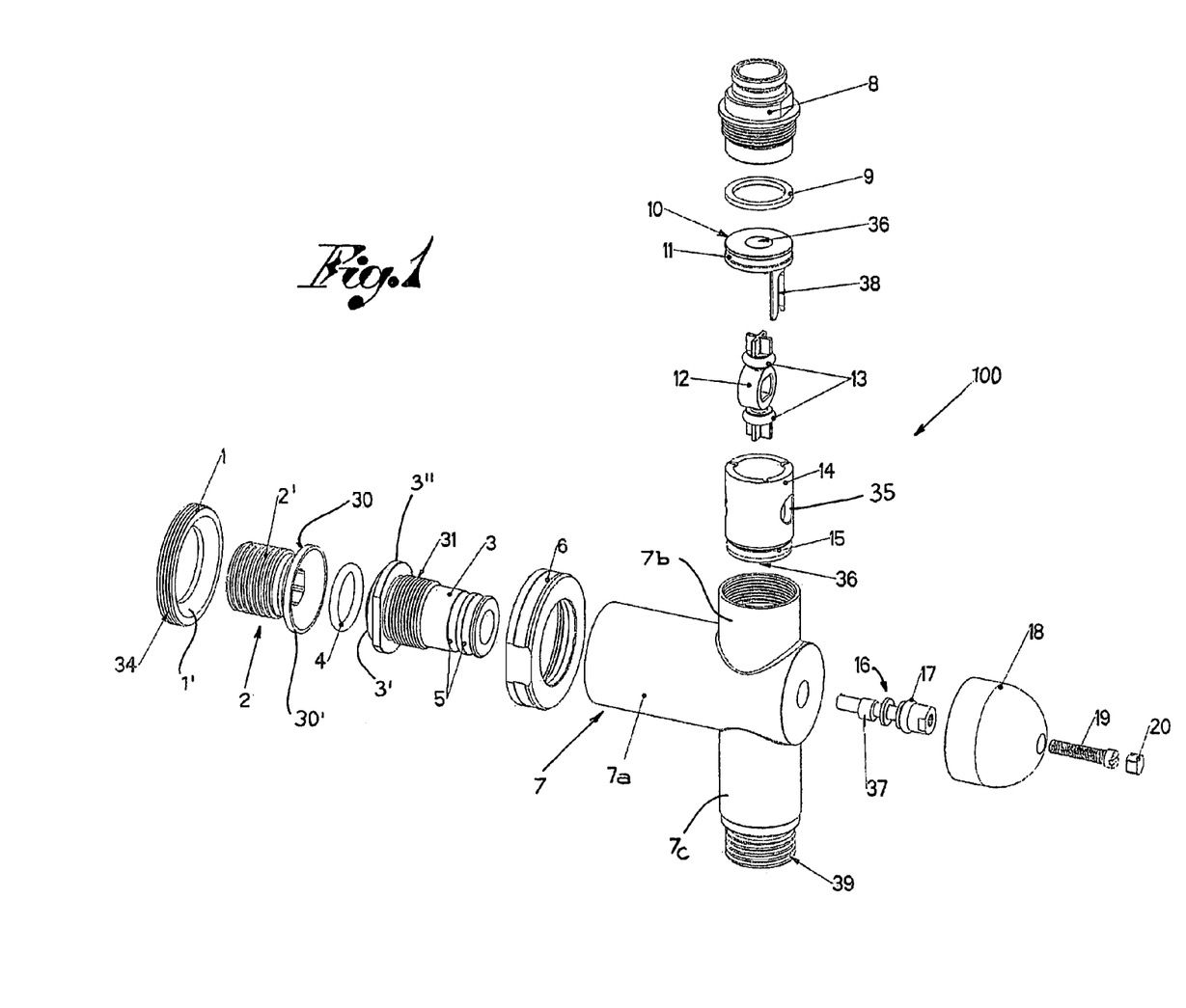
FIG. 1 shows a perspective exploded view of the distribution device according to the present invention.
Figure 2:
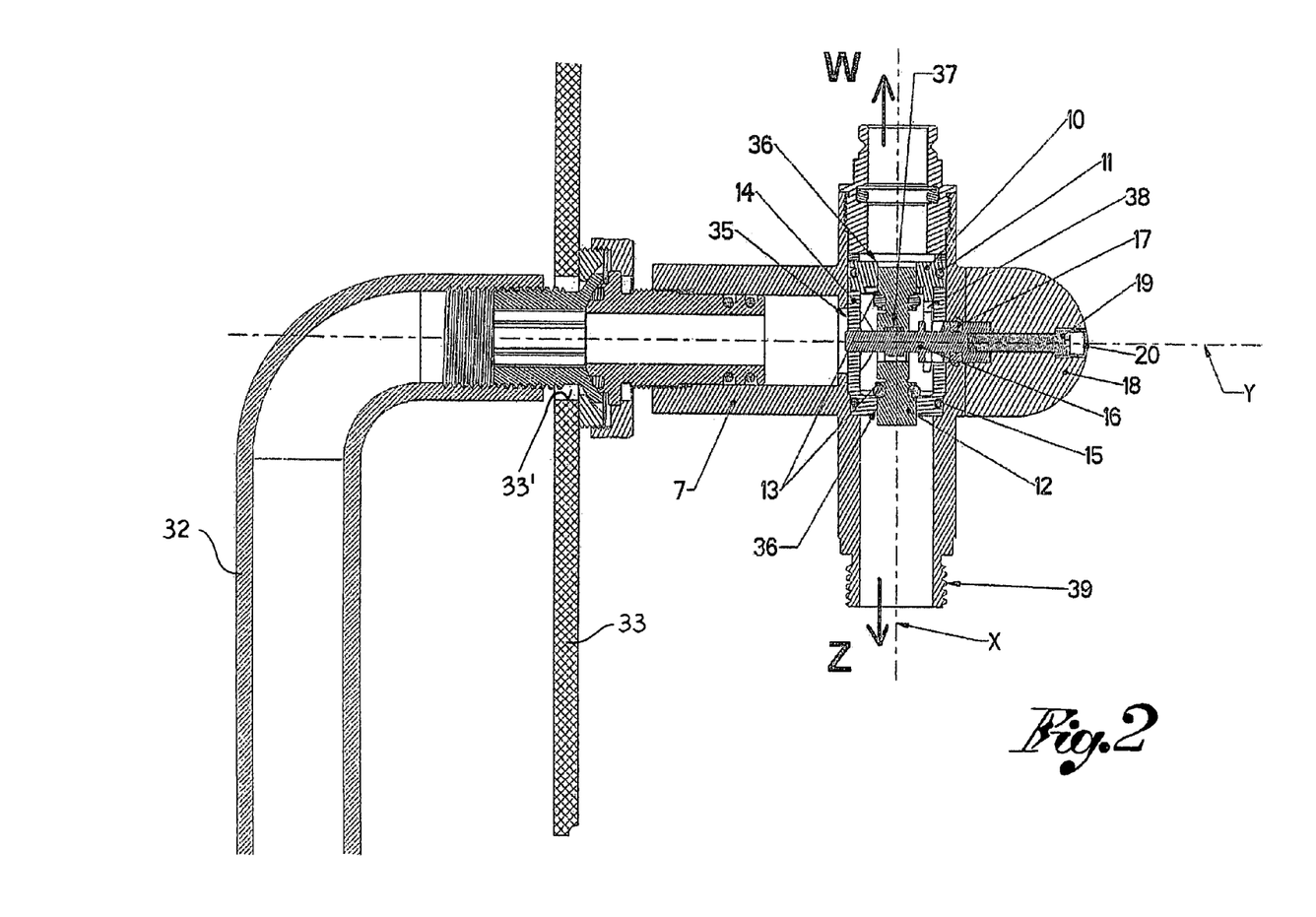
FIG. 2 shows an axial section view of the device in a first usage configuration thereof.
Figure 3:
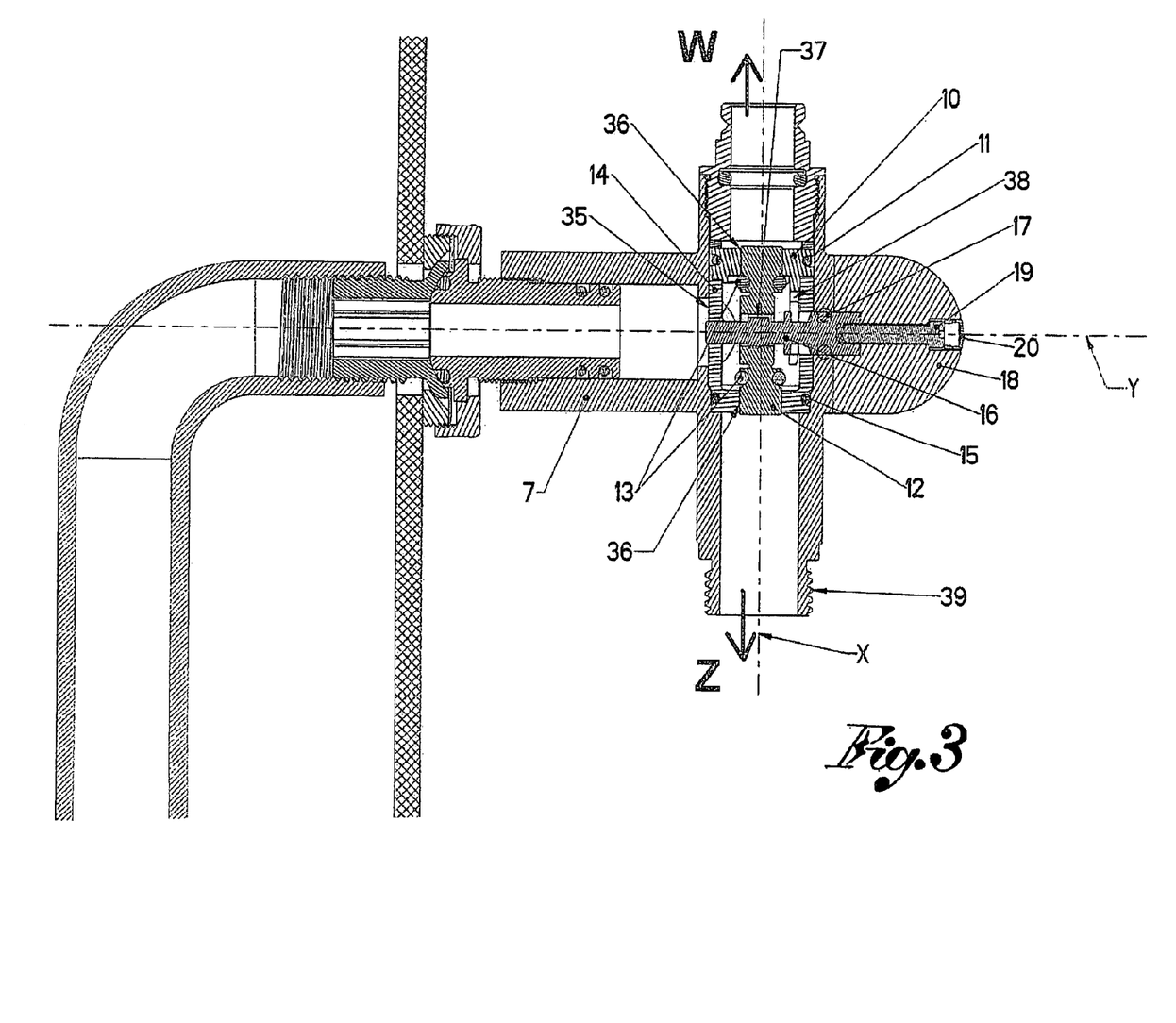
FIG. 3 shows an axial section view of the device in a second usage configuration thereof.

According to a first and a second usage configuration (FIGS. 2 and 3), the water flow is allowed only through one of the two outlets.

Figure 4:
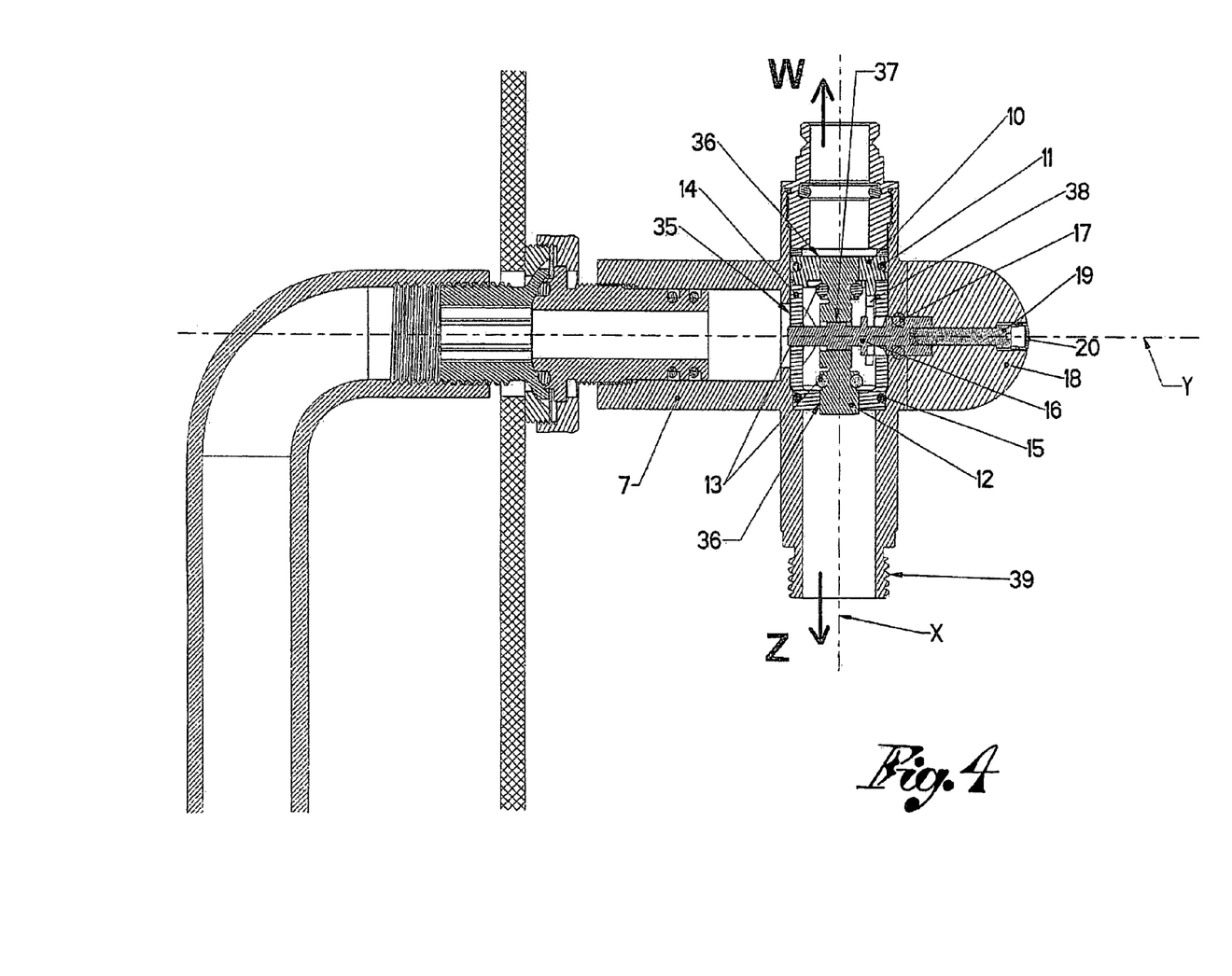
FIG. 4 shows an axial section view of the device in a third usage configuration thereof.

According to a third usage configuration (FIG. 4), the water flow is allowed through both outlets at the same time.

According to an aspect of the invention, a seat is provided inside body 7 suitable for seating a control cartridge 14.

Cartridge 14 is suitable for receiving a gate 12 therein.

Gate 12 is axially movable along axis X by control means externally actually by a user, for example by rotation.

In this way, gate 12 selectively allows or prevents the water flow from the inlet to at least one of the two outlets.

In other words, the fluid outflows in two different directions (Z-W) along axis X. According to how gate 12 is positioned, water moves towards one or the other direction, or from both.

In fact, the fluid reaches body 7 where a selective switching system is provided which has cartridge 14 and gate 12.

The selective switching system is preferably assembled along the main directrices represented by axis X and axis Y.

Cartridge 14 has slots or apertures 35, for example circular, through which the fluid reaches the interior of the cartridge itself, to be directed afterwards.

In fact, gate 12 is present inside for selecting the flow direction.

At the two ends thereof, the gate is provided with sealing means 13, for example O-rings.

Moreover, the sealing means 13 are suitable for selectively preventing the fluid flow in direction Z or in direction W by closing the fluid outlet passages 36.

The movement of gates 12 along axis X is ensured by an eccentric pin 16, which acts along axis Y; in other words, the eccentric pin 16 works as a revolving cam system.

In fact, pin 16 has a cam 37 that eccentrically influences the interior of gate 12.

In this way, cam 37 allows gate 12 to move upwards or downwards along axis Y thereof.

The selective switching system is closed by a plug 10, that is, gate 12 and cartridge 14 are axially locked by plug 10.

Plug 10 preferably carries a fork 38 that blocks the motion along axis Y of pin 16, which would otherwise be free to move, slipping off along axis Y.

In accordance with an embodiment, an outlet passage 36 of the fluid from body 7 towards the bottom outlet 7c is obtained at the bottom of cartridge 14; the other passage 36 towards the top outlet 7b is obtained in plug 10 closing the cartridge.

Pin 16 carries a seal 17, such as an O-ring for fluid sealing along axis Y, inside the selective switching system.

Moreover, seals 11 and 15, fitted on plug 10 and on cartridge 14, respectively, carry out the seal in the two outflow directions Z and W, that is, along axis X.

It should be noted that union 8 also acts as axial locking means for plug 10 and thus cartridge 14 inside body 7. A sealing washer 9 is further arranged between union 8 and plug 10.

According to an aspect of the invention, pin 16 is axially associated to a grasping device 18, such as a hand grip, a handle, a knob and the like, for forming the control means.

Handle 18 serves for imparting a twisting torque to pin 16, for rotating cam 37 that influences gate 12 for the selective realization of one between the first, the second or the third usage configuration, that is, for adjusting and actuating the switching movement, rotating about axis Y.

Moreover, a fixing screw 19 is provided for integrally and removably associating handle 18 to pin 16.

Favorably, a small plate 20 is provided associated to the head of the fixing screw, as a protection of the screw itself.

Thus, if the user wants to change the fluid outlet side, he/she simply needs to actuate handle 18, rotating 16 to one or the other direction, and then selectively moving gate 12 towards the top outlet or the bottom outlet; in this way, an interval of positions of gate 12 is defined inside body 7 whose positional ends relate to the first usage configuration or to the second usage configuration, that is, respectively the configuration wherein the fluid flow is allowed in direction Z and the configuration wherein the fluid flow is allowed in direction W.

Moreover, within said interval, the gate can be selectively positioned each time in countless relative axial positions relative to body 7, that is, to cartridge 14, by handle 18, for example realizing the third usage configuration.

According to another aspect of the invention, device 100 comprises an angular positioning system 1-4 suitable for compensating any shifts of the outlet of the water feeding duct 32 relative to axis Y orthogonal to a surface 33, for example a wall, for installing the switching device 100.

In fact, device 100 is provided with an adapter union or articulated union 2, suitable for cooperating with an interface 1, such as a wall flange, associable to the fluid delivery, for keeping device 100 always perpendicular to said surface 33.

Favorably, the angular positioning system comprises the adapter union 2.

Preferably, the adapter union 2 has a surface 30, for example a semi-spherical surface, suitable for angularly cooperating with interface 1.

The adapter union 2 is screwed and coupled to the tubing of the water system through an opening 33' obtained in the support surface or wall 33.

In other words, the adapter union 2 is substantially arranged along axis Y and at an end is provided with threaded means 2' for the connection, for example, to the inlet tube 32, and at a second end with a concave cap 30', for example semi-spherical, which radially extends from the adapter union 2 externally defining the convex surface 30.

In turn, interface 1 has a concave annular inner surface 1' suitable for receiving with possibility of angular movement the outer convex surface 30 of the adapter union 2.

In other words, the convex surface 30 of union 2 and the concave surface 1' of interface 1 form a spherical coupling between union and interface.

In the use, flange or interface 1 rests against wall 33, around opening 33'. Cap 30' of union 2 protrudes from wall 33 through opening 33' and rests with the outer surface 30 thereof on surface 1' of interface 1.

The switching device 100 comprises a telescopic union 3 suitable for being connected to the adapter union 2 for placing body 7 in fluid communication with the fluid feeding duct 32.

Said telescopic union 3 has a head 3' having such convex shape as to be seated in cap 30' of the adapter union 2 with the interposition of an annular sealing ring 4, such as an O-ring.

Said head 3' further has an annular projection 3" defining a step wherein it engages a ring nut 6 for locking the telescopic union to interface 1 and thus to the adapter union 2.

In accordance with one embodiment, said interface 1 has an outer threading 34 on which the ring nut 6 is screwed.

Figure 7:
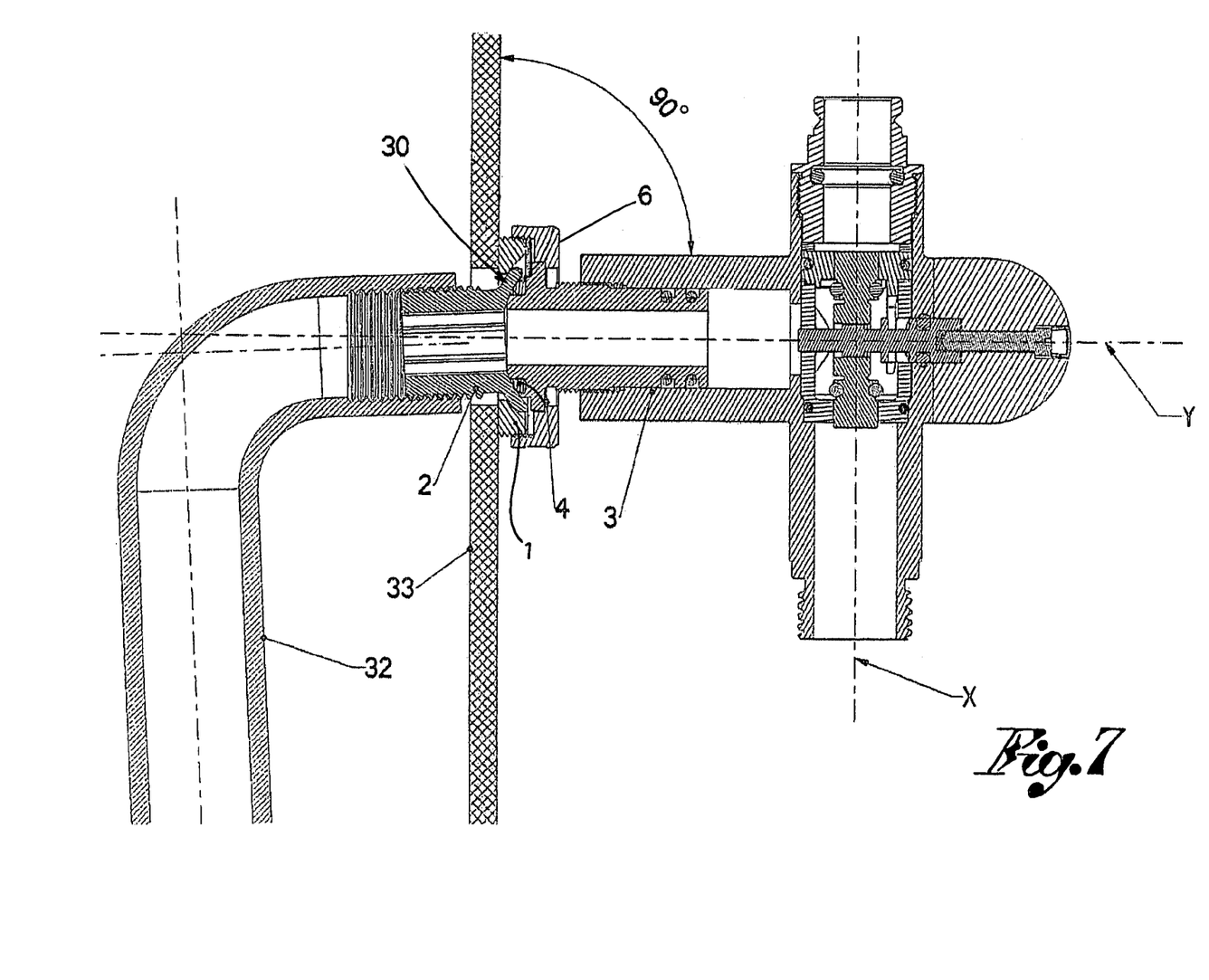
FIG. 7 shows an axial section view of the device in a third assembly configuration thereof.
Figure 8:
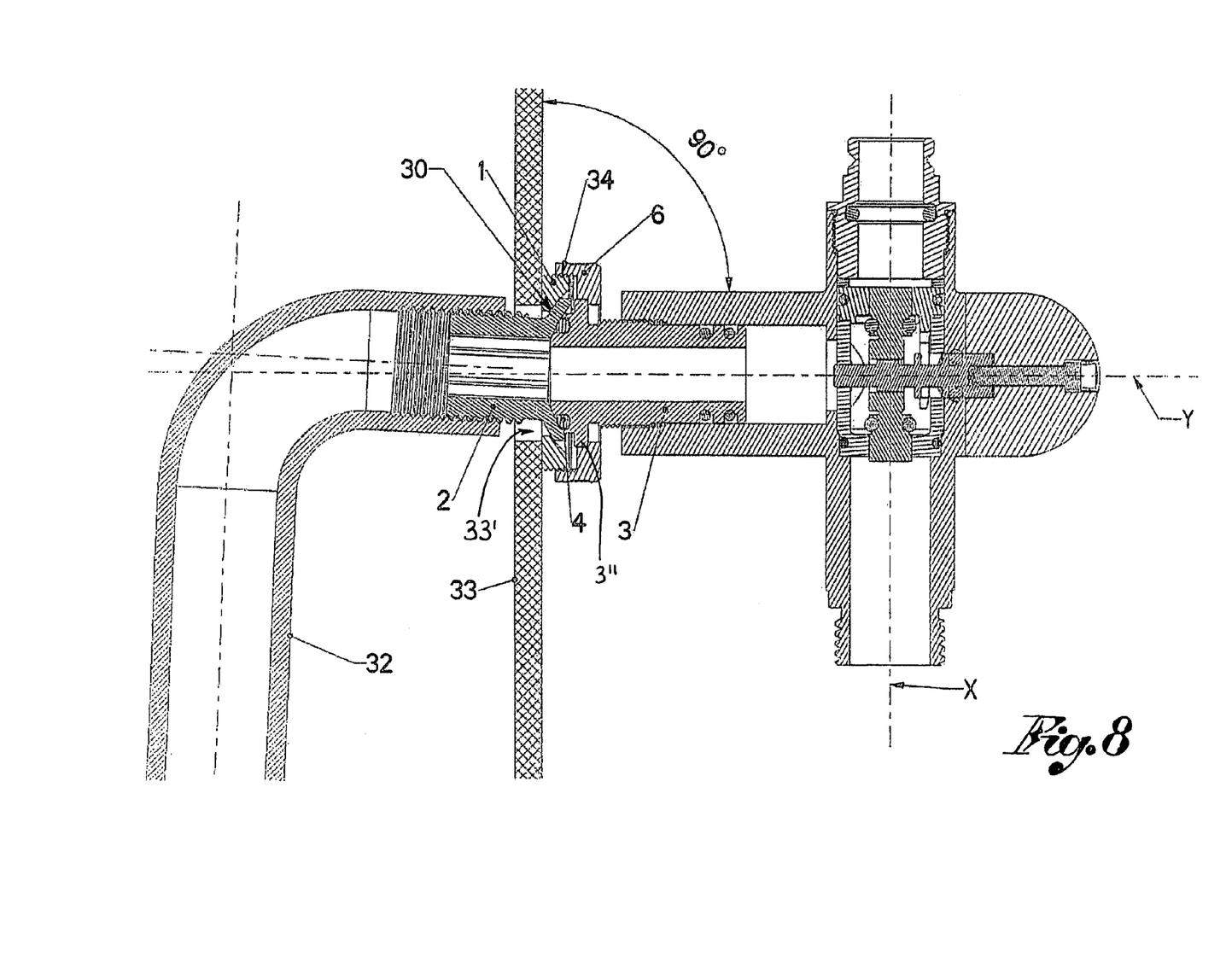
FIG. 8 shows an axial section view of the device in a fourth assembly configuration thereof.

It is therefore clear that even if the outlet of duct 32, and thus the adapter union 2, is not coaxial to axis Y but is inclined relative to it (FIGS. 7 and 8), thanks to the spherical coupling between surfaces 30 and 1', interface 1 is always perfectly resting on wall 33, that is, with the axis thereof coinciding with axis Y. Thus, the wall locking of the telescopic union 3 and thus of device 100 by ring nut 6 always occurs along axis Y.

It should be noted that any inclination between the adapter union 2 and the telescopic union 3 is compensated and therefore made possible by the presence of the annular sealing element 4 held between the concave cap 30' and the convex head 3'.

According to a preferred embodiment, the telescopic union 3 is connected to body 7 by threaded means 31, which cooperate with the inlet of body 7 itself.

Advantageously, by acting on the threaded means 31, body 7 is allowed to progressively and variably seat therein, along axis Y, at least one portion of the telescopic union 3.

For example, by screwing of body 7, the same is moved close to surface 33, while reducing the portion of visible outer surface of the telescopic union 3.

Figure 5:
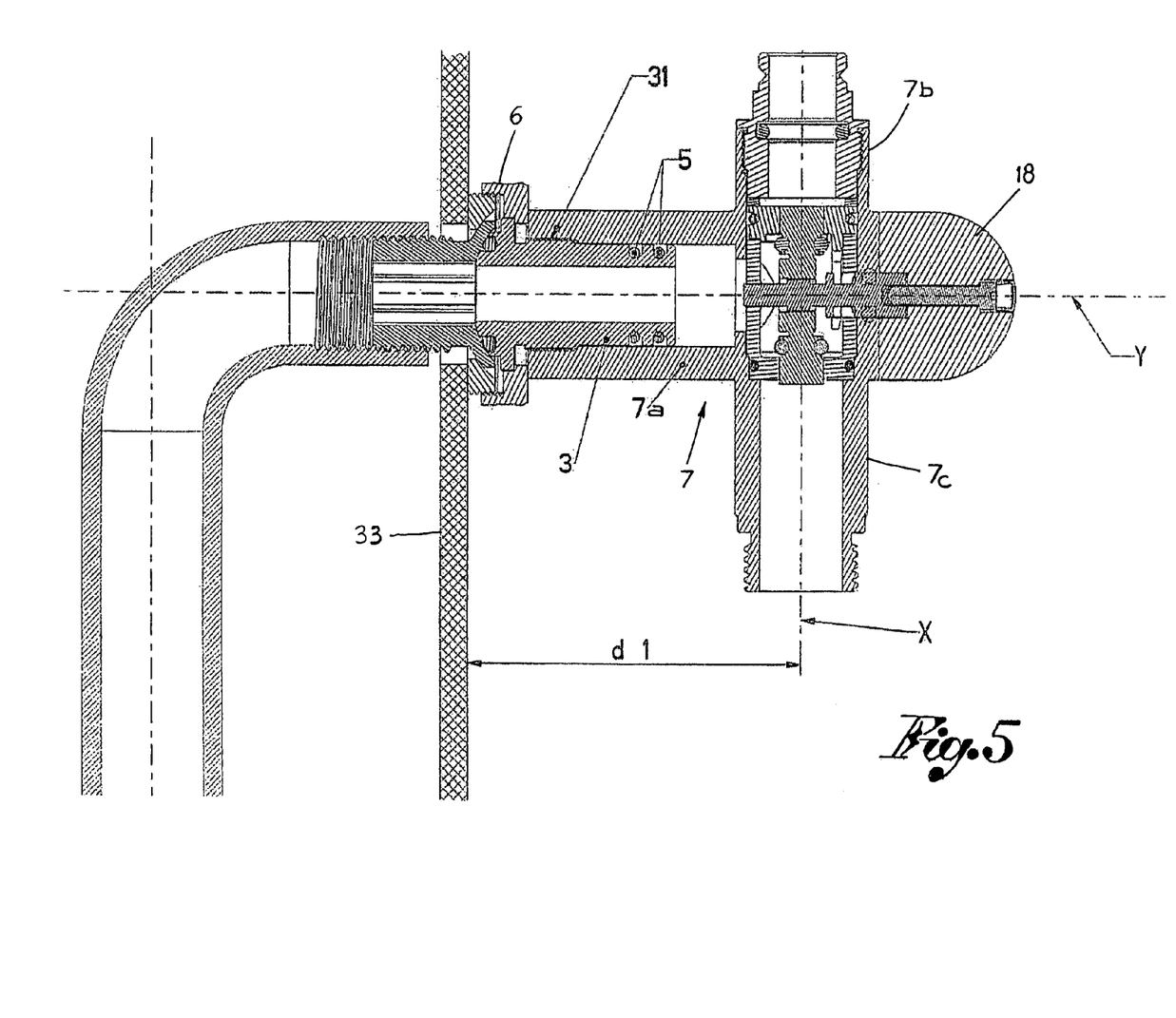
FIG. 5 shows an axial section view of the device in a first assembly configuration thereof.
Figure 6:
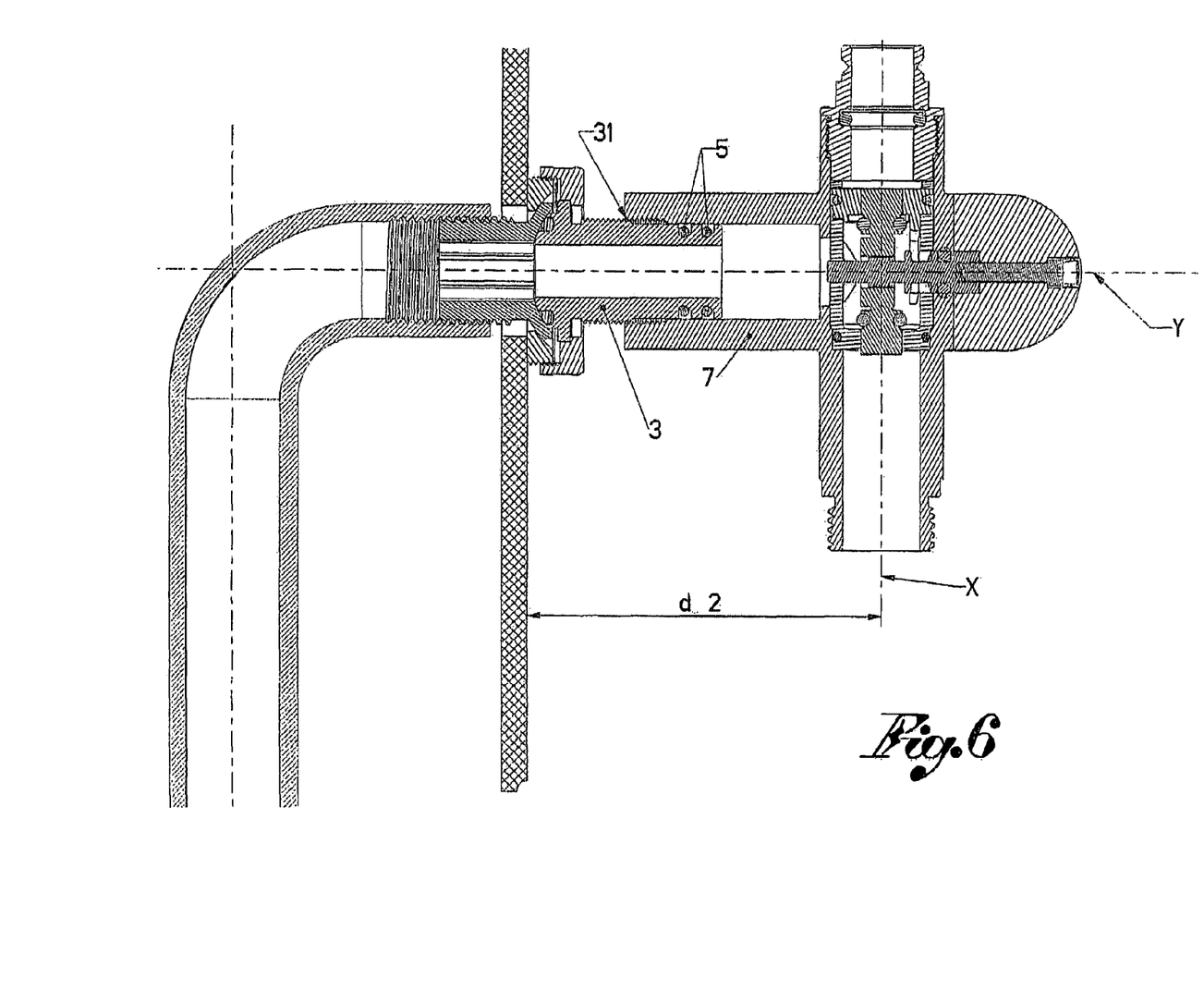
FIG. 6 shows an axial section view of the device in a second assembly configuration thereof.

Favorably, it is thus possible to change the distance between axis X of the selective switching system and the resting surface 33 as desired, for example obtaining desired distances, such as d1 and d2 (FIGS. 5 and 6).

The position along said axis Y of body 7 relative to surface 33 is therefore adjustable by screwing said body 7 on said threaded means 31 of the telescopic union 3.

The fluid seal within the axial adjustment system between the telescopic union 3 and body 7, is ensured by the presence of seals 5, such as O-rings, arranged on union 3.

Advantageously, therefore, device 100 allows a selective water switching by a single control means, such as handle 18, which influencing gate 12, defines differing flow modes, as illustrated above.

According to another advantageous aspect, device 100 allows remedying any installation mistakes and/or structural defects of the water feeding duct 32 or of fixing surfaces or wall 33, by the provision of the adapter union and of interface 1, easy to apply during the assembly step itself.

According to a further advantageous aspect, device 100 envisages that by the telescopic union 3 it is possible to easily adjust the distance of device 100 from the wall, thus allowing the adaptability to different shower structures, also existing ones.

It is clear that a man skilled in the art may make several variations and changes to the fluid distribution device according to the present invention in order to meet specific and incidental needs, all falling within the scope of protection defined in the following claims.

What is claimed is:

1. A fluid distribution device, in particular for shower structures, comprising:
    a "T" shaped body suitable for being connected to a water feeding tubing by an inlet and defining at least two outlets of said fluid, said inlet being arranged along a first axis, said outlets being arranged along a second axis,
    a gate placed into said body and axially movable along said second axis between said two outlets,
    control means actuable by a user,
    said control means being suitable for influencing said gate for selectively allowing a passage of said fluid from said inlet to one of said two outlets or to both at the same time, wherein said gate is placed and movable into a control cartridge arranged into a seat inside said body, said gate cooperates with two outlet passages of the fluid from the body towards the outlets, a passage being obtained in a bottom wall of the cartridge, the other passage being obtained in a plug closing said cartridge and an eccentric pin, operating along said first inlet axis and controlled by said control means, which actuates said movement of said gate along said second axis wherein said plug is suitable for locking said control cartridge along said second axis, wherein said plug carries a fork that interferes with said pin along said first axis preventing the pin from slipping off said body.

2. A fluid distribution device, in particular for shower structures, comprising:
- a "T" shaped body suitable for being connected to a water feeding tubing by an inlet and defining at least two outlets of said fluid, said inlet being arranged along a first axis, said outlets being arranged along a second axis,
- a gate placed into said body and axially movable along said second axis between said two outlets,
- control means actuable by a user,
- said control means being suitable for influencing said gate for selectively allowing a passage of said fluid from said inlet to one of said two outlets or to both at the same time, and
- an interface, such as a wall flange, suitable for being placed on a support surface for the device, and an adapter union suitable for cooperating with said interface for the connection of the body to the tubing, said adapter union and said flange being suitable for forming a spherical coupling so as to always maintain the device perpendicular to said surface.

3. A device according to claim 2, wherein said adapter union has threaded means at an end thereof for the connection to the fluid feeding tube, and at an opposite end, a concave cap, for example semi-spherical, externally defining a convex surface for resting on the interface.

4. A device according to claim 3, wherein said interface has a concave annular inner surface suitable for receiving with possibility of angular movement the outer convex surface of the adapter union.

5. A device according to claim 4, comprising a telescopic union suitable for being connected to the adapter union for placing the body in fluid communication with the fluid feeding duct, said telescopic union having a head having such convex shape as to be seated into the cap of the adapter union with the interposition of an annular sealing element, such as an O-ring.

6. A device according to claim 5, wherein said head further has an annular projection defining a step wherein it engages a ring nut for locking the telescopic union to the interface and thus to the adapter union.

7. A device according to claim 6, wherein said interface has an outer threading on which the ring nut is screwed.

8. A device according to claim 5, wherein said telescopic union is screwed to the inlet of the body so as to allow adjusting the distance between the assembly surface and said axis.

9. A device according to claim 5, wherein the fluid seal between said telescopic union and said body is ensured by the presence of seals arranged on said union.

* * * * *